Oct. 5, 1937.  A. F. TREMBLAY  2,094,626
GLASS MANUFACTURE
Filed Dec. 30, 1935  2 Sheets-Sheet 2
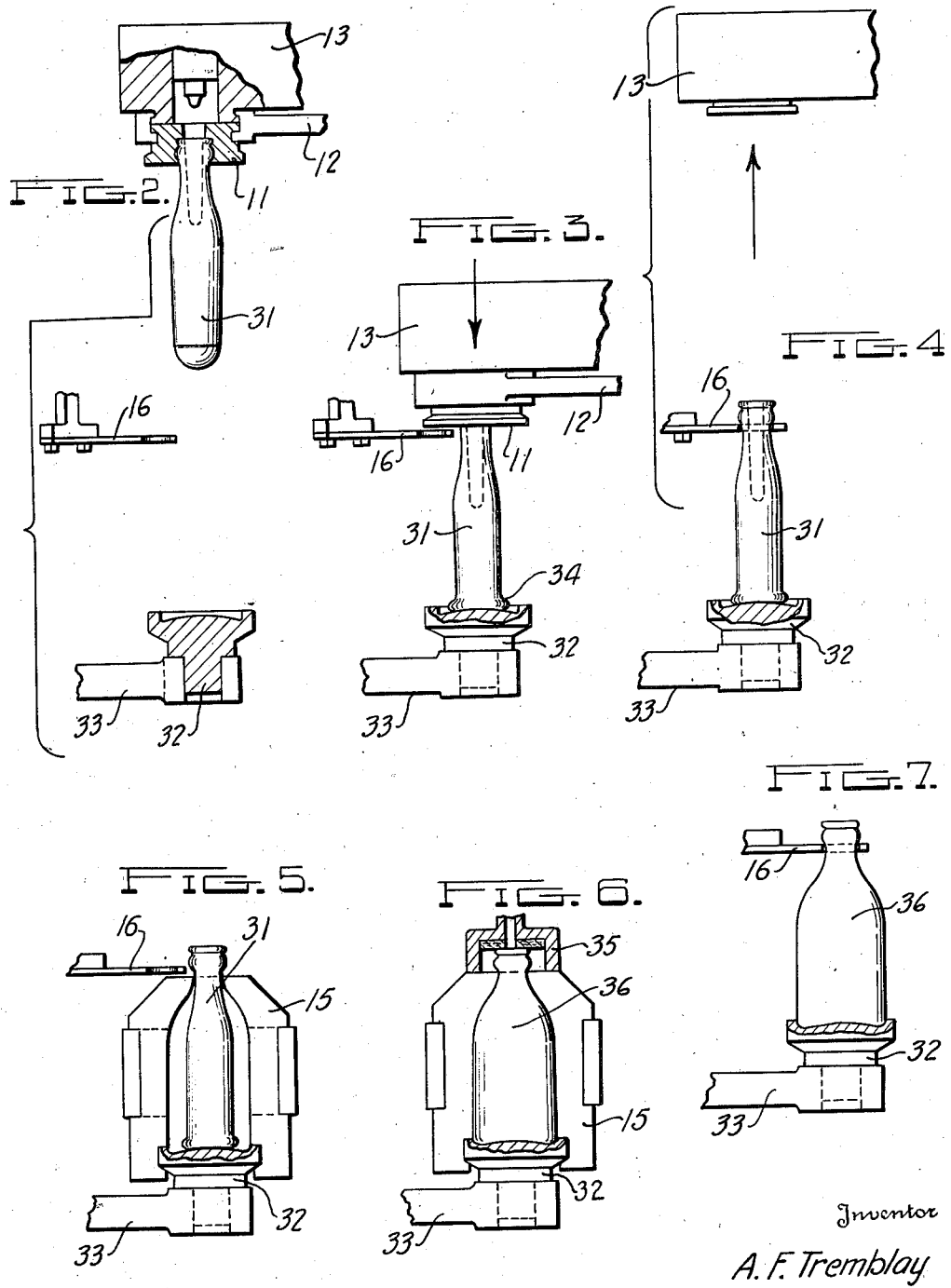
Inventor
A. F. Tremblay
By Owen & Owen
Attorneys Patented Oct. 5, 1937

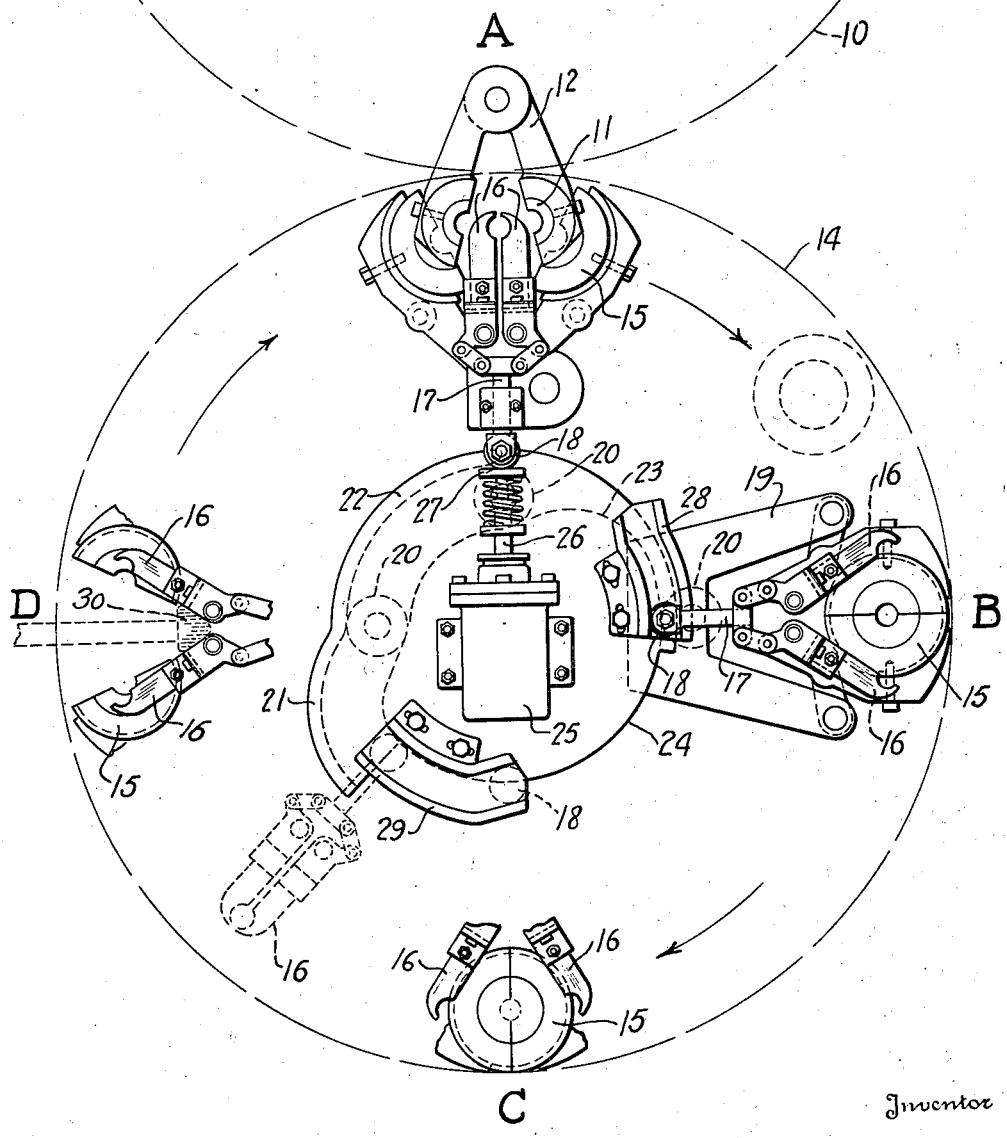

2,094,626

UNITED STATES PATENT OFFICE 2,094,626

GLASS MANUFACTURE

Albert F. Tremblay, Toledo, Ohio, assignor to Kent-Owens Machine Company, Toledo, Ohio, a corporation of Ohio Application December 30, 1935, Serial No. 56,665

33 Claims. (Cl. 49—5)

This invention relates to glass manufacture and more specifically to a method of and apparatus for blowing glass.

An object of the invention is to provide a method and apparatus whereby the shaping of glass with regularity and uniformity particularly by blowing, is facilitated.

Other objects and details of the invention will appear as the description proceeds.

In the accompanying drawings forming a part of this specification, Figure 1 is a diagrammatic plan view of apparatus forming one embodiment of the invention; Figures 2 to 7 are elevations of the glass and associated parts in successive stages of the process during which the blank is transferred to the blow mold, blown therein and delivered therefrom.

The invention is disclosed as embodied in the type of apparatus where blanks or parisons are formed by a series of blank molds on a rotating table and are blown by a series of blow molds on a table rotating in co-ordinated relation with the blank table. As illustrated in Figure 1, there is indicated a blank table 10 carrying a series of blank molds including neck rings 11 carried by arms 12. Other portions of the blank forming apparatus, including the bodies of the blank molds, are not shown as their specific construction forms no part of the present invention. In conjunction with the neck rings on the blank mold, there is indicated an arm 13 through which vacuum may be applied to draw glass into the blank mold, if desired, and through which a suitable plunger may be thrust to form the initial blow opening, if desired. The specific construction of such means and their operation does not form a part of the present invention and so is not disclosed.

There is also indicated a blow table 14 which rotates in co-ordinated relation with blank table 10 by means of intermeshing gears or other suitable registering devices. The blow table 14 carries a series of blow molds 15, of which there are four in the example shown. Above each blow mold there is a pair of guide members 16 operated by a slide 17 connected with a cam wheel 18, which is operated in a way that will be described later. The blow molds are opened and closed by arms 19 actuated by a roller 20 which encounters a cam portion 21 to open the blow mold, runs along a cam portion 22 which maintains the mold in open condition, then encounters cam portion 23 which closes the mold, and thereafter runs along a concentric cam portion 24 which maintains the mold in closed condition.

A cylinder 25 is provided having a piston therein which actuates a piston rod 26 having on its end a cushion member 27 adapted to encounter cam roller 18 and close guide members 16 at transfer station A, as indicated on Figure 1. A cam 28 is provided in the path of roller 18 which opens guide members 16 while the blow mold is passing from station A to station B, as indicated on Figure 1. Another cam member 29 is provided for again closing the guide members while the blow mold passes from station C to station D, as indicated on Figure 1. At station D, the guide members are opened by a device diagrammatically indicated at 30, as will be described later.

The apparatus thus diagrammatically indicated may be operated as follows. When a blow mold and a blank 31 are brought into registration at position A, as indicated in Figure 2, the blank 31 is in axial registration with a blow mold bottom 32 carried in fixed position upon the blow mold table by a holder 33. Thereupon, the neck ring is lowered, as shown in Figure 3, until the bottom of the blank rests upon the blow mold bottom and preferably is slightly spread, as indicated at 34. The neck ring may be lowered with the entire parison mold carrier, as disclosed in my co-pending application for "Glass article shaping machine", Serial No. 10,256, filed March 9, 1935, or in any other suitable way. The neck ring is then opened and at substantially the same time, or quickly enough to prevent the blank from falling over, actuating fluid is introduced into cylinder 25 and thereby the guide members 16 are closed around the upper part of the blank. Preferably the guides are so positioned that they do not quite contact the glass unless the glass moves slightly out of exact vertical position. The purpose of this is to insure against the guides marking the neck or pressing into the glass. However, where it is found desirable to operate with the glass so soft when transferred that it does not maintain itself in proper form without some support at the top, the guides may be so constructed that the bead of the neck sinks down and rests upon the closed guides.

During the next intermittent movement of the tables when the blow mold is moved in the direction indicated by the arrow from position A to position B, the blow mold is closed by cam portion 23. In the construction shown the guides are opened by the cam 28 before the blow mold reaches station B. Thereupon, a blow head 35 is applied to the upper end of the parison and the blow mold, and preferably presses the upper end of the parison downward slightly, thereby insuring uniform length in the blown bottle 36, regardless of any slight settling which may occur after the parison is released by the neck ring and before it is blown.

After the article has been suitably blown, and as the mold moves from station C towards station D, the guides are again closed about the upper part of the blown article by cam 29, and immediately thereafter the blow mold is opened by cam portion 21. This leaves the blown article 35 sitting upon the blow mold bottom with its top within guide members 16, as indicated in Figure 7.

While the article is at position D, any suitable take-out device may be operated to open guides 16 and remove the blown article. Member 30 has been indicated diagrammatically to illustrate how a member in connection with the take-out device might open the guides at the take-out position, but it will be readily understood that the exact construction and operation of the take-out mechanism forms no part of the present invention, except in so far as it effects the removal of the article and the opening of the guides.

It will be readily understood that the invention described above relates primarily to the operation of the guide members in the described combination, and that the details of the blank forming and transferring mechanism or of the blowing mechanism or the take-out device, may be varied as desired within the scope of the appended claims.

It will be readily understood that the guide member at the rear of the article as the article moves from position A to position B is more necessary than the guide at the front, as the tendency of the article is to fall backwards when the table is started. Also, centrifugal force tends to cause the upper end of the parison to move outward away from the axis of the mold carrier. It is this tilting backward and outward which is primarily guarded against by the guide construction. It will be readily understood that a single guide member might be substituted for the tongs, especially if this guide member were placed on the rear of the parison and with a finger extending on the outside thereof so as to prevent rearward or outward tilting movement.

As has been indicated, it is considered preferable to lower the neck ring sufficiently to spread the bottom of the parison to some extent. This forms a firm support for the parison, shortens the elongated parison to a predetermined amount, and also aids in forming the bottle bottom, particularly where the center of the bottom is materially higher than the edges.

As previously indicated, when the blow head is applied, it preferably presses down the upper end of the parison to a certain extent, thereby further spreading the bottom and shortening the parison. This sometimes aids in fitting the parison properly into the top of the blow mold and also insures a definite, predetermined length to the finished ware regardless of any slight sinking and spreading of the parison by gravity after it is released by the neck mold and before it is blown.

By leaving the parison sitting upon the blow mold bottom with its entire sides exposed for a time after it is delivered from the neck ring and before the blow mold is closed thereabout, there is provided a reheating period wherein the heat from the interior of the blank reheats the outer portions of the blank, thereby rendering the temperature of the blank more uniform throughout its cross-section than would be the case otherwise.

During this time, the upper end of the blank is contacted only to the extent which proves absolutely necessary to maintain the blank in axial alignment. Thereafter, the tongs are removed so as to avoid interference with the application of the blow head, although it will be understood that some of the advantages of the invention might be obtained even though the blow head were so constructed that it could be applied to the mold with the tongs closed so that this removal of the tongs during blowing is necessary to achieve the objects of the invention only to the extent that it is specified in the appended claims. Also, while the tongs may be employed advantageously for maintaining the alignment of the blown article with the mold bottom when the sides are opened, it will be understood that other features of the invention may be obtained without utilizing this feature. Also, while it is preferred to open the tongs at the take-out station by means of a take-out device, it will be readily understood that this phase of the invention might be omitted without preventing the accomplishment of other valuable functions of the invention. Other obvious changes might be made within the scope of the appended claims.

What I claim is:

1. In a glassware machine, a parison receiving unit comprising a bottom plate and a guide, means to deposit a parison on the bottom plate, and means to position the guide adjacent to, but normally out of contact with, the parison.

2. In glass forming apparatus, a mold comprising a bottom and sides, means to deposit a glass blank upon the mold bottom, a guide, means to position the guide adjacent to, but normally out of contact with, the upper end of the blank as it rests on the mold bottom, and means to close the mold sides about said blank.

3. In glass forming apparatus, a blow mold comprising a bottom and sides, means to deposit a blank upon said bottom, a guide, means to bring the guide into guiding relation with the upper end of the blank after the blank has been deposited on said bottom, and means to close the mold sides about the guided blank.

4. In glass forming apparatus, a blow mold comprising a bottom and sides, means to lower a blank vertically and spread its bottom on said mold bottom and leave the blank standing unsupported except by said bottom, a guide, means to bring the guide into guiding relation with the upper end of the blank after the blank has been deposited on said bottom, and means to close the mold sides about the guided blank.

5. A glassware machine comprising a neck mold for supporting a parison, a bottom plate, mold sides, a guide separate from the parts named, and means for operating the neck mold to bring a parison into engagement with the bottom plate, and release the parison carried thereby from the neck mold, and thereafter bring the guide into guiding relation with the parison and close the mold sides thereabout.

6. A glassware machine comprising a neck mold for supporting a parison, a bottom plate and a parison guide, means for producing relative movement of the neck ring and bottom plate to bring the free end of the parison into engagement with the bottom plate so that it is flattened thereon, means for releasing the parison from the neck mold, and means for bringing the guide into guiding relation with the parison, but out of contact therewith.

7. In glass forming apparatus, a movable mold comprising a bottom and sides movable to and from closed position over the bottom, means to deposit a glass blank upon the bottom of the open mold, means to move the bottom with blank thereon, and means, in addition to the mold and normally out of contact with the glass, for preventing lateral tilting of the blank when the bottom is moved.

8. In glass forming apparatus, an intermittently rotatable mold carrier, a series of blow molds on the carrier, each comprising a bottom and sides, means to deposit a blank upon a mold bottom while the carrier is at rest, a guide mounted on said carrier, and means to position it on the rear and outer side of the top of said blank as the carrier starts to rotate, and means to close the mold sides about the blank after the carrier starts to rotate.

9. In glass blowing apparatus, a blow mold comprising a bottom and sides movable to and from closed position over the bottom, a guide member, and means to move the member into guiding position to maintain the upper end of a glass object concentric with said bottom immediately before closing and before opening of the mold sides and out of alignment with said bottom during blowing.

10. In glass blowing apparatus, a blow mold comprising a bottom and sides, means to deposit a glass blank upon the bottom of the open mold, means to close the sides about the blank before blowing, a guide, and means to position the guide in guiding relation to the top of the blank before the sides are closed, move the guide away before blowing, and return the guide to guiding position before the sides are opened.

11. A glassware machine comprising a rotary carrier, a neck mold thereon, a second rotary carrier with parison supporting means and closeable mold sides thereon, means for intermittently rotating said carriers, and means for transferring a parison from the neck mold to the parison supporting means during a rest period and means for closing the mold sides about the parison during carrier rotation.

12. In a glassware machine, an annular series of parison holding means on a first carrier, an annular series of bottom plates and blow molds on a second carrier, said carriers being laterally spaced apart, means for intermittently rotating said carriers, means for transferring a parison from a parison holding means to a bottom plate during a period of non-rotation and means for closing a blow mold about the parison while the blow mold carrier is rotating.

13. In a glass machine, two carriers, an annular series of parison neck rings on one carrier, an annular series of blow molds, each consisting of a bottom and sides movable to and from closed position over the bottom, on the other carrier, means to rotate said carriers synchronously and intermittently, said neck rings and molds being so positioned that one neck ring is in axial alignment with one blow mold bottom during a rest period of the carriers, means to produce relative movement of said neck ring and bottom while they are in alignment to bring the bottom into contact with a parison in said neck ring, to open said neck ring, and to bring a guide into guiding relation with the top of the blank while the carriers are at rest.

14. In glass forming apparatus, a movable carrier, a plurality of molds mounted on the carrier to be brought successively into charging, forming and discharging positions by movement of the carrier, each mold comprising a bottom and sides movable to and from closed position above said bottom, a guide member mounted above each mold, and means to move each guide member into concentric relation with its respective mold bottom at the charging position, away from said relation before the forming position, and back into said relation before the discharging position.

15. In glass blowing apparatus, an intermittently movable carrier, a plurality of blow molds mounted on the carrier in position to be brought by movement of the carrier successively into charging, blowing and discharging positions, a pair of tongs mounted above each mold, means for closing each pair of tongs successively while at rest at the charging station, and means to open each pair of tongs successively as it moves away from the charging station.

16. In glass blowing apparatus, an intermittently movable carrier, a plurality of blow molds mounted on the carrier in position to be brought by movement of the carrier successively into charging, blowing and discharging positions, a pair of tongs mounted above each mold, means for closing each pair of tongs successively while at rest at the charging station, and means to open each pair of tongs successively as it moves away from the charging station, and means to close each pair of tongs in succession as it approaches the discharge station.

17. In glass blowing apparatus, a blow mold comprising a bottom and sides movable to and from closed position above said bottom, means to move said mold intermittently to and from charging position, means to deposit a glass blank on said bottom at the charging position, a guide, and means to move the guide into guiding position for the upper end of a blank while the mold is at rest at the charging position and away from guiding position while the mold is moving from charging position.

18. In glass forming apparatus, a mold comprising a bottom and sides movable to and from closed position above said bottom, a pair of tongs in position to open and close above said sides, means to close the tongs to hold a shaped glass article in alignment above the bottom while the sides open, and means operable by a take-out device to open said tongs.

19. In glass forming apparatus, a mold having a bottom and sides movable to and from closed position above said bottom, means to deposit a glass blank on said bottom while the sides are open, a guide above the mold, means operable in succession to first bring the guide into guiding relation with the top of the blank, then close the mold, and remove the guide, and then return the guide and open the mold, and means operable by a take-out device for again removing the guide from guiding position.

20. In glass forming apparatus, an intermittently movable mold carrier, a mold mounted on said carrier and comprising a bottom and sides, a pair of guide tongs mounted above the mold, means to deposit a glass blank on the mold bottom while the carrier is at rest, a stationary fluid-operated means for closing the tongs about the upper end of the blank, a stationary cam, and means operated by said cam and opening the tongs as the carrier moves the mold away from the position in which it receives the blank.

21. Apparatus in accordance with claim 20 and comprising a second stationary cam and means actuated by said second cam to close the mold as it moves away from the position in which it receives the blank.

22. In glass blowing apparatus, an intermittently movable mold carrier, a blow mold mounted on said carrier and movable thereby from a receiving position to a discharge position, said mold comprising a bottom and sides movable to and from closed position above the bottom, means to deposit a blank on the bottom at the receiving station, tongs mounted above the mold, means at the receiving station to close the tongs about the upper end of the deposited blank, means to open the tongs and close the mold while the mold is moving away from the receiving station and to close the tongs and open the mold while the mold is moving to the discharge station, and means operable by a take-out device to open the tongs at the discharge station.

23. Apparatus in accordance with claim 22 and in which the mold opening and closing means comprises a stationary cam.

24. Apparatus in accordance with claim 22 in which the first said tong-closing means comprises a fluid-operated means, and later said tong-operating means comprises cams.

25. In glass blowing apparatus, a blow mold consisting of a bottom and sides movable to and from closed position above the bottom, means to deposit an elongated parison on said bottom and simultaneously shorten the parison to a predetermined length, means operating in timed relation to said depositing means for closing said sides a predetermined time after the parison is deposited, and means to further shorten the parison to a predetermined length after said sides are closed.

26. In glass blowing apparatus, a blow mold having a bottom, a blow head, a parison neck ring, means to bring said neck ring to a predetermined position in axial alignment with the mold bottom to shorten the parison to a predetermined length by pressing it between said ring and bottom, means to open the neck ring and leave the shortened parison on the bottom, means to close the sides about the parison, and means to bring the blow head into engagement with the top of the parison and the top of the mold and thereby further shorten the parison to a predetermined length.

27. Apparatus in accordance with claim 25 and having timed operating means providing an interval after the opening of the neck ring and before the closing of the mold sides.

28. A method of forming glass, which comprises lowering a parison vertically onto a supporting surface and spreading the bottom of the parison thereon, leaving the parison for a time supported solely by said surface, and thereafter shaping the parison to desired form.

29. A method of forming glass which comprises vertically lowering an elongated parison onto a supporting surface, spreading the bottom of the parison upon said surface, leaving the parison temporarily supported solely by said surface, and thereafter blowing the parison.

30. A method of forming glass which comprises depositing a glass parison upon a stationary supporting surface, moving said surface laterally with the parison thereon, maintaining the parison in substantially vertical position on said surface during said movement by contacting the upper end thereof only when and if said upper end moves out of axial alignment, and thereby exposing the entire lateral surfaces of the parison during said movement, and then shaping the parison to desired form.

31. A method of forming glass which comprises depositing a glass blank upon a stationary supporting surface, moving said surface laterally with the blank thereon, maintaining the blank vertical on said surface during said movement by guide surfaces normally out of contact with the upper end of the blank but in position to maintain the substantially vertical position of the blank, and thereby exposing the entire lateral surfaces of the blank during said movement, and then enclosing the blank in a mold and shaping.

32. A method of forming glass which comprises vertically lowering an elongated blank upon a supporting surface, spreading the bottom of the blank upon said surface, leaving the blank temporarily supported solely by said surface, then centering the top of the blank, enclosing the blank in a mold, and blowing.

33. A method of forming glass which comprises forming an elongated blank, depositing it upon a supporting surface and simultaneously shortening it to predetermined length, leaving it standing on said surface and otherwise exposed only to gaseous contact for a period, thereafter again shortening the parison to a predetermined length, and blowing.

ALBERT F. TREMBLAY.